United States Patent Office 3,370,969
Patented Feb. 27, 1968

3,370,969
WATER-DISPERSIBLE COATING COMPOSITIONS CONVERTIBLE TO WATER RESISTANT FILMS
Berry O. Powell, Detroit, Mich., and Thomas W. Findley, La Grange, Ill., assignors to Swift & Company, Chicago, Ill., a corporation of Illinois
No Drawing. Filed June 4, 1964, Ser. No. 372,710
12 Claims. (Cl. 106—131)

This invention relates to a new class of coating and filmforming compositions and more particularly to water-soluable and water-dispersible film-forming substances which can be converted to the water insensitive form.

Water-soluble and water-dispersible film-forming materials such as animal and vegetable proteins, carbohydrates and carbohydrate derivatives, as well as certain synthetic film-forming materials such as polyvinyl alcohol and polyvinyl pyrrolidone have been employed as coatings, wrapping material, adhesives, etc. While these substances can be distributed over a surface as a thin continuous film and dried to form an adhesive bond or protective coating, they do possess some shortcomings, the most notable of which is water sensitivity of the film. Water sensitivity is generally characterized by a deterioration in the film when the dried film is exposed to moisture. This deterioration may take the form of dissolution of the film in water, or failure of the adhesiveness or adherence of the film to the surface on which it is deposited. Various water-soluble film-forming materials react in varying ways and undergo different degrees of deterioration when exposed to water.

Attempts to overcome water sensitivity in films prepared from the water-soluble or water-dispersible film-forming materials have involved the use of aldehydes, ketones, tanning agents and heavy metal salts in treating the film-forming material to promote water-insolubility. Thus polyvinyl alcohol has been modified with vinyl chloride either alone or in conjunction with comonomers of vinyl chloride and polymerization catalysts, and the animal and vegetable proteinaceous film-forming materials such as glue and gelatin have been treated with formaldehyde. Nevertheless the use of such water-insolubilizing agents has not been entirely satisfactory since the presence of these substances in the film-forming material often gives rise to additional problems. Furthermore, insolubilizataion with these treating agents is difficult to control and the film-forming material often develops objectionable high viscosity and graininess coupled with a shortened "pot life."

It is accordingly an object of this invention to provide a film-forming composition made up primarily of a water-soluble film-forming substance and small amount of a film improving agent which serves to reduce water sensitivity of said film forming material.

Another object of the invention is the provision of a composition including a major amount of a water-soluble or water-dispersible film-forming substance in combination with a water-soluble polyester of an epoxidized fatty material which composition is convertible to the water-insoluble form.

Still another object of the invention is to provide water-soluble or water-dispersible film-forming compositions having desirable long "pot life" which compositions can be cured to the water insensitive form.

Another object of the invention is to provide a method for improving the water resistance properties of water-soluble or water dispersible film-forming compositions.

An additional object of the invention is the provision of water insensitive films of water-soluble or water-dispersible film forming proteins, carbohydrates, carbohydrate derivatives, polyvinyl alcohol or polyvinyl pyrrolidone.

Additional objects of the invention, if not specifically set forth herein, will be readily apparent to those skilled in the art from the detailed description of the invention which follows.

Generally, the invention contemplates water-soluble or water-dispersible film-forming compositions which, when deposited on a substrate and dried are relatively impervious to the effects of moisture. These compositions comprise a major amount of a water-soluble or water-dispersible film-forming substance which is ordinarily water sensitive when dry along with a small amount of a water-soluble polyester of an epoxidized fatty derivative. The water-soluble polyester is present in an amount sufficient to render the water-soluble or water-dispersible film-forming composition water insensitive. This amount of the polyester also provides in coaction with the film-forming substance a film-forming composition having a spreadability or dispersibility far superior to that of the film forming material per se. The composition is useful as a protective coating on a variety of porous and non-porous substrates including wood and metal and also in paper coating and sizing.

More specifically, the compositions of the invention include mixtures of proteinaceous compositions capable of forming a continuous film or a carbohydrate or carbohydrate derivative capable of forming a continuous film, or a water-soluble synthetic polymer such as polyvinyl alcohol or polyvinyl pyrollidone in combination with a compatible water-soluble polyester derived from an expoxidized glyceride. The two components are miscible and form a single phase system. Also contemplated are mixtures of film-forming substances in admixture with the water sensitivity reducing water-soluble polyester. The two components of the mixture are physically combined, preferably in aqueous solution or emulsion to form a liquid film-forming composition having substantial resistance to viscosity increases.

Film-forming which are most markedly improved by the water sensitivity reducing agents of the invention include animal protein materials such as casein, glue, gelatin, soya protein, polysaccharides such as dextrin, starch, hydroxyethyl starch, wheat flour paste, methyl cellulose, ethyl cellulose, hydroxyethyl cellulose, carboxymethyl cellulose and similar water-soluble cellulosic derivatives. Water-dispersible film forming synthetic compositions such as polyvinyl alchol and polyvinyl pyrolidone are substantially improved by the polyesters of the invention inasmuch as films prepared from mixtures containing these polymers are greatly improved by the polyesters particularly insofar as resistance to dissolution in water and loss of adhesion upon exposure to water is concerned. In addition, water-soluble urea-formaldehyde condensation polymers are also rendered less water soluble by the polyesters of the invention.

The compatible water-soluble fatty epoxide derivatives useful in forming the compositions of the invention include those fatty compositions containing long chain (10–22 carbons) aliphatic hydrocarbon radicals substituted at least once and not more than about four times along said radicals with ester groups and hydroxyl groups on adjacent carbons on said aliphatic hydrocarbon chain. This configuration in the fatty chain can be characterized by the structure:

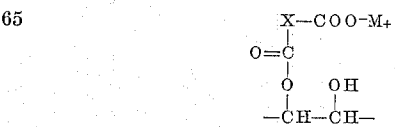

Where X is selected from the group consisting of alkylene radicals of 1–10 carbons, substituted alkylene radicals of 1–10 carbons, alkenylene radicals of 1–10 carbons, phenylene radicals, substituted phenylene radicals and mixtures thereof and M is selected from the group consisting of ammonium and volatile amino radicals. The substituents on the alkylene and phenylene groups can be hydroxyl, carboxyl or halogen and mixtures thereof.

These water-soluble epoxide derivatives are more fully described in copending application, Ser. No. 150,200, filed Nov. 6, 1961, now Patent No. 3,180,749, wherein Thomas W. Findley and H. E. Saewert are inventors. The disclosure of the application is incorporated herein by reference. The water-soluble derivatives are prepared by heating and reacting polyepoxidized fatty acid esters of lower monohydric and polyhydric alcohols with a stoichiometric amount of polybasic acid or polybasic acid anhydride until some but not all of the oxirane groups of the epoxidized fatty acid ester are combined through ester linkages with the acid or anhydride, and then adding a volatile amino or ammonium base to the reaction product to convert available carboxyl groups to salts. The reaction between the polyepoxide and carboxyl supplying agent is effected by gently heating a mixture of the oxirane containing composition and the acid or anhydride. The heating temperature and the time of heating varies with the reactivity of the polyepoxide and the functionality of the polycarboxylic acid or polycarboxylic acid anhydride or mixtures thereof. Usually one-half mole of a dibasic acid or dibasic acid anhydride is provided for each available oxirane group in the polyepoxide.

By "stoichiometric amount" of acid or anhydride is meant that enough acid or anhydride is employed to insure that one acid group be present for each epoxy group in the oxirane containing composition. In the case of an epoxidized triglyceride having four epoxy groups per mole two moles of a dibasic acid or anhydride will be employed, and where a tetracarboxylic acid is used as the carboxyl supplying base, only one mole of this tetrabasic acid will be required. Where the triglyceride has five epoxy groups per mole as with highly epoxidized linseed oil, two and one-half per mole of epoxidized linseed oil of a dibasic acid or anhydride is employed as the carboxyl reactant. In the prepolymer or water-soluble form, at least one epoxy group and at least one carboxyl group in the composition are unreacted and free to combine when the composition is cured.

The reaction employed to produce the patrially polymerized epoxide is most desirably carried out in the presence of a solvent. Unless the polycarboxylic acid or anhydride used in the formation of the polyester is compatible with the epoxide, it is difficult to obtain a single phase reaction. A low to medium boiling mutual solvent is recommended for carrying out the reaction and in those cases where the solvent is employed it serves as an effective temperature control since the reaction can be carried out at the boiling point of the solvent or at a lower temperature. Usually the inert more polar low and medium boiling solvents in which the epoxide and acid or anhydride are mutually soluble are preferred. Those alcohols, ethers, ketones and esters as well as mixtures thereof which will not react with the polyepoxide or carboxyl-supplying base are particularly useful. Examples of such solvents are the lower alkanols and lower alkenols having 1–5 carbons, ethyl ether, butyl cellosolve, acetone, methyl ethyl ketone, benzene, toluene and xylene. Also suitable are tetrahydrofuran and dimethyl formamide.

As the reaction between the polyepoxide and carboxyl supplying base proceeds, the viscosity of the reaction mixture increases. The reaction should be stopped and neutralized before the mixture gels. Another method for determining when the reaction should be terminated is that point at which an aliquot drawn from the reaction mixture is soluble in dilute aqueous ammonia or water solution of other water-soluble bases such as the alkali metal bases and water-soluble organic amines which form salts with available carboxyl groups. Suitable bases which may be employed for this purpose include sodium hydroxide, potassium hydroxide, sodium carbonate, as well as aqueous ammonia.

The source of the oxirane groups, specifically the polyepoxide, may be any oxirane containing composition having one or more long chain aliphatic hydrocarbon groups with

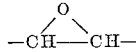

groups substituted in the aliphatic hydrocarbon chain. Esters of oxirane containing higher fatty acids with aliphatic monohydric, dihydric, trihydric, tetrahydric and pentahydric alcohols are most useful. Other sources of the oxirane containing material are the oxirane containing higher aliphatic alcohols, amides, hydrazides, ketones, etc. These polyepoxide compositions having one or more long chain 10–22 carbon alkyl or alkenyl radicals with the chains being substituted with one or more epoxy groups are suitable sources of the epoxy configuration.

Suitable fatty acids which when epoxidized provide a very desirable source of the epoxy group include the synthetic and naturally occurring ethylenically unsaturated fatty acids such as oleic acid, palmitoleic acid, linoleic acid, linolenic acid, ricinoleic acid, 9, 10, and 4, 5 decenoic acid, 3, 4–4, 5–9, 10 dodecenoic acid and other mono-, di- and tri-ethylenically unsaturated fatty acids having about 10–22 carbons. These acids when epoxidized in the form of derivatives such as amides, hydrazides or esters are all suitable as the epoxy containing material.

Particularly preferred as the polyepoxide from which the water-soluble polymers are prepared are the high oxirane higher fatty acid esters of nono-, di- and polyhydric aliphatic alcohols. These esters may be characterized as high oxirane fatty materials containing a plurality of oxirane rings at those points in the fatty acyl radical which are normally occupied by double bonds in the original non-epoxidized fatty acid ester. Monohydric and dihydric alcohol esters of the high oxirane fatty acids which are contemplated include the aliphatic esters wherein the alcohol portion of the ester is a monohydric alcohol having 1–8 carbons and aliphatic alcohol esters of dihydric alcohols having 2–6 carbons. The epoxy fatty acid component of the ester is made up of epoxy fatty acids of 10–30 carbons having an oxirane content above about 8.8% and generally up to about 10.3%. Suitable esters of this type are prepared from methyl, ethyl, propyl, isopropyl and butyl alcohols as well as the hexyl, heptyl and octyl alcohols.

The polyhydric alcohol esters of high oxirane fatty acids include tri-, tetra-, penta-, and hexahydric aliphatic alcohol esters of the fatty acid moiety. Included within this group are those alkyl and alkenyl alcohols having 3–6 carbons and 3 or more alcohol groups.

Suitable naturally occurring oils which when epoxidized may be used as the source of the high oxirane component are those vegetable and marine triglycerides containing a large proportion of unsaturated fatty acids. The linolenic acid oils which are primarily triglycerides of linoleic and linolenic acids are preferred. Among those oils which may be employed are highly epoxidized perilla oil, highly epoxidized safflower oil, and highly epoxidized linseed oil.

The carboxyl group supplying agent which is employed in approximately stoichiometric amounts based on the number of epoxy groups in the polyepoxide includes organic, aliphatic and benzenoid dibasic and polybasic acids and anhydrides. Usually about one carboxyl group for every oxirane group present in the polyepoxide is available in the partial polymerization reaction. Aliphatic dicarboxylic acids of both the saturated and unsaturated types such as malonic, adipic, maleic and fumaric acids can be used as the dicarboxylic acid. Tri- and tetracarboxylic acids such as citric acid, tartaric acid, aconitic acid, itaconic acid and tricarballylic acid are suitable for use in forming the polyester. Benzenoid acids which can be employed include phthalic acid, isophthalic acid, terephthalic acid, prehnitic acid, mellophanic acid, trimesic acid, mellitic acid, hemimellitic acid, trimellitic acid and pyromellitic acid.

Suitable anhydrides of polycarboxylic, aliphatic and aromatic acids include maleic anhydride, phthalic anhydride, tetrachlorophthalic anhydride, tetrahydrophthalic anhydride, 1,3-cyclopentane dicarboxylic acid anhydride, citraconic acid anhydride, pyromellitic dianhydride, trimellitic anhydride and other polybasic acid anhydrides which upon hydrolysis with water provide two or more carboxyl groups. Additional suitable anhydrides include HET anhydride, NADIC anhydride and chlorendic anhydride. Where the anhydride or mixture of anhydrides is employed as the source of the carboxyl groups it is necessary to include a small amount of water to convert anhydride groups to carboxyl groups to insure that the carboxyl groups are free to react.

The volatile base which is employed to neutralize avaliable carboxyl groups in the product resulting from the reaction between the epoxy fatty material and the polycarboxylic acid or anhydride can be ammonia or any amine having a vapor pressure sufficiently high so that it is volatilized at elevated temperatures usually encountered in curing. Those primary, secondary and tertiary aliphatic and aromatic amines having boiling points not in excess of about 175° C. are most satisfactory. Although primary and second alkyl amines can be employed, tertiary amines are preferred since tertiary amines do not undergo amide formation when the compound is heated. Primary and secondary aliphatic amines are less favored since they do undergo amide formation when the amine salt is heated. Specific amines most useful in forming the salts include triethyl amine, trimethyl amine, tripropyl amine, trimethylene diamine, morpholine, N-methyl morpholine, dimethyl aniline and other carbocyclic aromatic tertiary amines. Ammonia is also useful as the volatile base.

The water-soluble or water-dispersible film forming material may be combined in aqueous solution with a polyester derived from the epoxidized fatty material at any concentration level conducive to mixing and blending to form a homogenous solution. Generally at least about 20% of the polyester derivative based upon the weight of the film forming material may be combined with the film-forming material in aqueous solution.

The following examples are intended to illustrate specific embodiments of the invention and shold not be considered to impose any limitation on the invention.

EXAMPLE I

The polyester polymer wsa prepared by heating a mixture of 60 grams of epoxidized lineseed oil (oxirane oxygen content=9%) with 10 grams of trimellitic acid. The reaction was carried out at 65° C. for two hours in the presence of 60 ml. of tetrohydrofuran solvent. The product after the two hours reaction time had elapsed was neutralized with 10 ml. of 28% aqueous ammonia and 50 ml. of water was added followed by removal of most of the tetrohydrofuran by distillation to yield a solution of about 50% solids.

Ten grams of the polyester which remained was added to 100 grams of an aqueous solution of 100 grams of gelatin in one liter of water. The solution was mixed thoroughly until it was clear and films were cast from this solution and dried at room temperature. The clear film which resulted could be dissolved in water readily. The dried film sheet was cut into strips and the strips were subjected to various heat treatments and these strips were compared to a control strip of a gelatin film cast from a 10% aqueous gelatin solution containing no added polyester.

Heating of the control film and the film prepared from the mixture of gelatin and polyester for one hour at 130° C. resulted in the production of two quite different films insofar ast water sensitivity is concerned. The control film when exposed to water swelled and partially dissolved whereas the film containing the polyester water sensitivity stabilizer was unaffected by water and remained clear. This film did not swell or absorb water and did not dissolve even when heated in the presence of water. A third strip of the film made up of the mixture of gelatin and polyester was heated to 205° C. for only three minutes and another film of the same mixture was heated at 100° C. for four hours. These films had characteristics substantially identical to that made up of the mixture of components heated to 130° C. for one hour.

EXAMPLE II

Ten grams of the water-soluble polyester prepared in Example I was added to 100 grams of a 10% aqueous solution of methyl cellulose. The solution was agitated to obtain uniform distribution of the solids in the aqueous solution and films were cast from this solution. These films were dried in a stream of warm air and the dried film was heated in an oven at 205° C. for five minutes after which is was unaffected by water.

EXAMPLE III

The polyester polymer was prepared by dissolving 306 grams epoxidized linseed oil (oxirane oxygen content 9.0%, iodine value 4.0) in a solution of enough dimethyl formamide to dissolve 100 grams of fumaric acid. The solvent solution of the epoxidized linseed oil and fumaric acid was agitated and heated to 100° C. The reaction proceeded rapidly, causing an exothermic peak of 140° C. in ten minutes. At this point, 100 ml. of 28% aqueous ammonia was added to neutralize unreacted fumaric acid and form the salt of the polyester. 5 grams of the polyester product was dissolved in 100 grams of a 10% aqueous solution of animal bone glue. The mixture was agitated to obtain uniform distribution of the polyester throughout the aqueous solution. A film was cast from this solution and dried in a stream of warm air. The dried film was then divided into two portions, one of which was held at room temperature for six days, while the other was baked at 180° C. for four minutes. The baked specimen was unaffected by water soaking; whereas, the air-dried, nonbaked film redispersed in water to form a turbid solution.

EXAMPLE IV 19 grams of trimellitic anhydride and 35 grams of epoxidized linseed oil (oxirane content 9.2%, iodine value 3.2) were refluxed in sufficient tetrahydrofuran to dissolve the anhydride and oil. Reflux was carried out at a temperature of 65° C. for one hour and forty minutes. At the end of this time, 50 ml. of water was added to the reaction mixture and all but a minor amount of the tetrahydrofuran was removed by distillation. 30 ml. of 28% aqueous ammonium hydroxide was added to produce a water-soluble polyester reaction product. 5 grams of this polyester reaction product was added to 100 grams of a 10% aqueous solution of bone glue and the mixture was agitated to obtain uniform distribution of the components. A film was cast from this solution and the film was dried in a stream of warm air. The film was divided into two portions, one of which was baked at 180° C. for four minutes, while the other was held at room temperature for six days. The baked specimen was unaffected by soaking in water. The specimen which was not baked was dispersible in water.

EXAMPLE V

A mixture of 200 grams epoxidized linseed oil (oxirane oxygen content 9.0%, iodine value 4.0) and 42 grams tartaric acid was dissolved in methanol and the solution was heated for about sixteen hours at 32° C. Morpholine was added to the reaction mixture in an amount equivalent to one part morpholine to ten parts of the reaction product exclusive of the solvent. After removal of the solvent by distillation, 5 grams of the reaction product was taken and dissolved in 100 grams of a 10% aqueous solution of wheat flour paste. After stirring the solution, a film was cast from the solution and the film air-dried as in the previous examples. Baking of the air-dried film resulted in adherent, water-insensitive film.

EXAMPLE VI

A solution of 306 grams of epoxidized linseed oil (oxirane oxygen content 9.2%, iodine value 4.0) and 100 grams maleic acid in 306 grams of tetrahydrofuran was refluxed for one hour at 65° C. At the end of this time, 60 ml. of 28% aqueous ammonia was added to the reaction mixture, followed by the addition of 750 grams of water. The tetrahydrofuran was removed by fractional distillation and the reaction product in aqueous solution was diluted by the addition of water to produce a solution containing 10% solids. Equal parts of this 10% aqueous solution of the polyester were blended with a 10% aqueous solution of gelatin and films were cast from the solution. After making of these films at 180° C. for four minutes, and in the case of another film at 205° C. for five minutes, the plastic films which resulted exhibited substantial resistance to the deleterious effects of water.

EXAMPLE VII 10 grams of the polyester prepolymer prepared in accordance with Example I was added to 100 grams of a 10% aqueous solution of a water-soluble starch. The solution was agitated and films were cast from this solution. The adhesive film which resulted was baked at a temperature of 100° C. for four hours. After this baking, the film was unaffected by water.

EXAMPLE VIII 10 grams of the polyester prepared in accordance with Example III was added to 100 grams of a 10% aqueous solution of wheat flour and films were cast and dried. Of the three films which were produced, one was baked at 100° C. for eight hours, another was baked at 150° C. for one hour, while the third was baked at 200° C. for five minutes. The three films were substantially identical insofar as physical characteristics and freedom from the effects of water is concerned.

EXAMPLE IX 1 gram of the water-soluble polyester salt prepared in accordance with Example IV was added to 100 grams of a 3% solution of hydroxy ethyl cellulose. Films were cast from the solution and these films air-dried, followed by baking in an oven at 105° C. for three hours. These films were not affected by water.

EXAMPLE X 2.5 grams of the water-soluble polyester salt prepared in accordance with the method of Example IV was added to 100 grams of a 10% aqueous solution of dextrin and films were cast from this solution. After drying of the films, one was baked at 100° C. for four hours, another was baked at 130° C. for one hour, while the third was baked at 205° C. for three minutes. All of these films were substantially insoluble in water.

The mixture, when cast from aqueous solution in the form of a film, can be cured at temperatures in the range of about 100–200° C. or higher. The temperature to which the film must be heated in the curing step is generally that temperature at which the anion of the salt portion of the polyester is volatilized, permitting the carboxyl group to combine with the remaining epoxy groups in the polyester. Generally, water is first removed from the film by forced air or vacuum-heating at moderate temperatures before curing. The curing cycle for a given water-soluble or water-dispersible film-forming material can be readily determined by those skilled in the art, since mixtures containing different water-sensitive film-forming materials act differently insofar as curing at elevated temperatures are concerned.

As has been pointed out previously, it is advisable to utilize at least about 20% of the water-soluble polyester based upon the weight of the water-soluble film-forming material to obtain good results insofar as reducing water sensitivity of these materials is concerned. It may be possible, in some instances, to utilize lesser amounts to obtain less than the optimum amount of water resistance. Larger amounts can be employed, although the use of more than about 75% based on the amount of water-sensitive film-forming material results in substantial changes in the physical characteristics of the film; for example, flexibility, elasticity, elongation, etc.

The aqueous solution of the mixture can vary in solids content over a wide range, depending upon requirements with respect to viscosity and ease of application of the film. Generally, very dilute solutions can be employed in the deposition of very thin films, while more concentrated solutions can easily be employed to cast thicker films. It is to be understood that inert materials can be incorporated in the film-forming mixture and such substances as fillers, pigments, plasticizers, stabilizers, etc., can be used in the film-forming mixture without departing from the spirit and scope of the invention.

Obviously, many modifications and variations of the invention may be made without departing from the spirit and scope thereof and, therefore, only those limitations should be imposed as are indicated in the appended claims.

We claim:

1. A film-forming composition which is dispersible in water and can be applied as a film from a water carrier and subsequently converted to the water-insensitive form comprising: a water-dispersible film-forming composition and about 10–75% based on the weight of said water-dispersible composition of a compatible, water-soluble polyester of a non-terminal epoxidized fatty acid ester containing aliphatic hydrocarbon radicals having 9–29 carbons and at least one unreacted oxirane group and substituted at least once and not more than four times along said radicals on adjacent carbons with ester groups and hydroxy groups, and having attached to each ester group at least one carboxyl group in free or neutralized form.

2. A water-dispersible film-forming composition which is hardenable by heating to a water-insensitive form comprising: a major amount of a water-dispersible film-forming composition and a minor amount of a higher fatty epoxide having more than one epoxy group per molecule which has been partially reacted with polycarboxylic acid and the unreacted carboxyl groups of said acid are neutralized with a material selected from the group consisting of ammonia and volatile organic amines.

3. The water-dispersible, film-forming composition of claim 2 wherein the water dispersible component is an animal protein.

4. The water-dispersible, film-forming composition of claim 2 wherein the water-dispersible, film-forming material is gelatin.

5. The water-dispersible, film-forming composition of claim 2 wherein the water-dispersible, film-forming material is a vegetable protein.

6. The water-dispersible, film-forming composition of claim 2 wherein the water-dispersible, film-forming material is a cellulose ether.

7. The water-dispersible, film-forming composition of claim 2 wherein the water-dispersible, film-forming material is starch.

8. The film-forming composition of claim 2 wherein the water-dispersible, film-forming material is polyvinyl alcohol.

9. The water-dispersible, film-forming composition of claim 2 wherein the higher fatty epoxide is an epoxidized vegetable oil.

10. The water-dispersible, film-forming composition of claim 2 wherein the polycarboxylic acid is an aromatic polycarboxylic acid.

11. A method of rendering water-dispersible, film-forming materials, which are ordinarily water-sensitive when dried, impervious to the effect of water comprising: embodying in said water-sensitive, film-forming material a small amount of a higher fatty epoxide having more than one epoxy group per molecule which has been partially reacted with polycarboxylic acid and the unreacted carboxyl groups of said acid are neutralized with a material selected from the group consisting of ammonia and volatile organic amines having a boiling point not in excess of about 175° C. and distributing said epoxidized fatty acid derivative uniformly throughout said water-sensitive, film-forming substance and heating whereby a film impervious to the effect of water is produced.

12. A method for improving the water resistance properties of water-soluble, film-forming materials comprising: incorporating in an aqueous solution with said water-soluble, film-forming materials a small amount of a water-soluble salt of the oxirane substituted reaction product obtained by reacting polyepoxidized glyceride oils with polycarboxylic acids and heating whereby a film impervious to the effect of water is produced.

References Cited

UNITED STATES PATENTS

| | | | |
|---|---|---|---|
| 3,304,344 | 2/1967 | Szawlowski | 260—830 |
| 2,993,920 | 7/1961 | Budde et al. | 260—23 |
| 3,003,978 | 10/1961 | Coney et al. | 106—171 |
| 3,180,749 | 4/1965 | Findley et al. | 106—243 |

DONALD E. CZAJA, *Primary Examiner.*

LEON J. BERCOVITZ, *Examiner.*

R. A. WHITE, *Assistant Examiner.*